US 9,522,783 B2

(12) United States Patent
Boni et al.

(10) Patent No.: US 9,522,783 B2
(45) Date of Patent: Dec. 20, 2016

(54) WAREHOUSE-RELATED METHOD AND FACILITY

(71) Applicant: Carego Innovative Solutions, Inc., Burlington (CA)

(72) Inventors: Martin Boni, Burlington (CA); Robert A. Edwards, Burlington (CA); Demetrius Tsafaridis, Burlington (CA)

(73) Assignee: Carego Innovative Solutions, Inc. (CA)

( * ) Notice: Subject to any disclaimer, the term of this patent is extended or adjusted under 35 U.S.C. 154(b) by 0 days.

(21) Appl. No.: 14/395,206

(22) PCT Filed: Nov. 1, 2013

(86) PCT No.: PCT/CA2013/000935
§ 371 (c)(1),
(2) Date: Oct. 17, 2014

(87) PCT Pub. No.: WO2014/066989
PCT Pub. Date: May 8, 2014

(65) Prior Publication Data
US 2015/0298907 A1    Oct. 22, 2015

Related U.S. Application Data

(60) Provisional application No. 61/721,865, filed on Nov. 2, 2012, provisional application No. 61/835,800, filed on Jun. 17, 2013, provisional application No. 61/897,289, filed on Oct. 30, 2013.

(30) Foreign Application Priority Data

Nov. 14, 2012  (CA) .................................... 2795624
Jan. 16, 2013  (CA) .................................... 2802429

(Continued)

(51) Int. Cl.
*G06F 7/00*     (2006.01)
*B65G 1/16*     (2006.01)
(Continued)

(52) U.S. Cl.
CPC .............. *B65G 1/16* (2013.01); *B65G 1/0457* (2013.01); *B65G 57/20* (2013.01); *B65H 49/38* (2013.01);
(Continued)

(58) Field of Classification Search
None
See application file for complete search history.

(56) References Cited

U.S. PATENT DOCUMENTS 4,503,978 A    3/1985  Smit et al.
4,642,017 A    2/1987  Fenn
(Continued)

FOREIGN PATENT DOCUMENTS

CA    2584306    3/2007
CA    2795624    5/2014
(Continued)

OTHER PUBLICATIONS

Tsafaridis, Demetrius; Restriction Requirement for U.S. Appl. No. 14/395,203, filed Oct. 17, 2014, mailed Dec. 30, 2015, 6 pgs.
(Continued)

*Primary Examiner* — Yolanda Cumbess
(74) *Attorney, Agent, or Firm* — Taylor English Duma LLP

(57) ABSTRACT

An arrangement of coils of varying widths and diameters in a warehouse having an automated crane wherein: the coil axes are parallel; the coils are arranged in lines, the coil widths in each line falling within a first predetermined range associated with the line, the coil diameters in each line falling within a second predetermined range associated with (Continued)

the line and the coil axes in each line being orientated perpendicularly to said each line; the lines define (i) rows of coils; (ii) a bottom layer of coils; and (iii) one or more upper layers of coils; each upper layer coil is supported by a pair of lower layer coils in a line; the first and second predetermined ranges associated with the line in which said each coil is arranged are the same as those associated with the line in which the supporting coils are arranged.

10 Claims, 9 Drawing Sheets

(30) Foreign Application Priority Data

Jan. 16, 2013 (CA) ..................................... 2807309
Apr. 5, 2013 (WO) ................ PCT/CA2013/000329

(51) Int. Cl.

| | |
|---|---|
| *B65H 49/38* | (2006.01) |
| *B65G 1/04* | (2006.01) |
| *B65G 57/20* | (2006.01) |
| *B66C 13/18* | (2006.01) |
| *B66C 17/06* | (2006.01) |
| *B65G 1/20* | (2006.01) |

(52) U.S. Cl.
CPC ............... *B66C 13/18* (2013.01); *B66C 17/06* (2013.01); *B65G 1/20* (2013.01); *B65G 2201/0232* (2013.01)

(56) References Cited

U.S. PATENT DOCUMENTS

| | | | |
|---|---|---|---|
| 4,796,209 A | 1/1989 | Burk | |
| 2005/0226713 A1* | 10/2005 | Tsafaridis | ............ B65G 67/603 |
| | | | 414/803 |
| 2006/0104800 A1 | 5/2006 | Armbruster | |
| 2007/0039909 A1 | 2/2007 | Dement | |
| 2008/0255699 A1* | 10/2008 | Hama | ..................... B21B 37/00 |
| | | | 700/149 |
| 2011/0315765 A1 | 12/2011 | Schantz et al. | |

FOREIGN PATENT DOCUMENTS

| | | |
|---|---|---|
| CA | 2802429 | 7/2014 |
| CA | 2807309 | 7/2014 |
| EP | 0659660 | 6/1995 |
| WO | 0214203 | 2/2002 |
| WO | 2011131836 | 10/2011 |
| WO | 2014066976 | 5/2014 |

OTHER PUBLICATIONS

Tsafaridis, Demetrius; International Search Report and Written Opinion for PCT/CA2013/000329, filed Apr. 5, 2013, mailed Jul. 18, 2013, 4 pgs.
Tsafaridis, Demetrius; U.S. Provisional Application entitled: Warehouse-Related Method, U.S. Appl. No. 61/721,865, filed Nov. 2, 2012, 39 pgs.
Boni, Martin; International Search Report and Written Opinion for PCT/CA2013/000935, filed Nov. 1, 2013, mailed Feb. 18, 2014, 5 pgs.
Boni, Martin; U.S. Provisional Application entitled: Warehouse-Related Method and Facility, U.S. Appl. No. 61/835,800, filed Jun. 17, 2013, 52 pgs.
Boni, Martin; U.S. Provisional Application entitled: Warehouse-Related Method and Facility, U.S. Appl. No. 61/897,289, filed Oct. 30, 2013, 49 pgs.
Tsafaridis, Demetrius; Non-Final Office Action for U.S. Appl. No. 14/395,203, filed Oct. 17, 2014, mailed Mar. 28, 2016, 15 pgs.
Tsafaridis, Demetrius; Final Office Action for U.S. Appl. No. 14/395,203, filed Oct. 17, 2014, mailed Sep. 12, 2016, 5 pgs.

\* cited by examiner

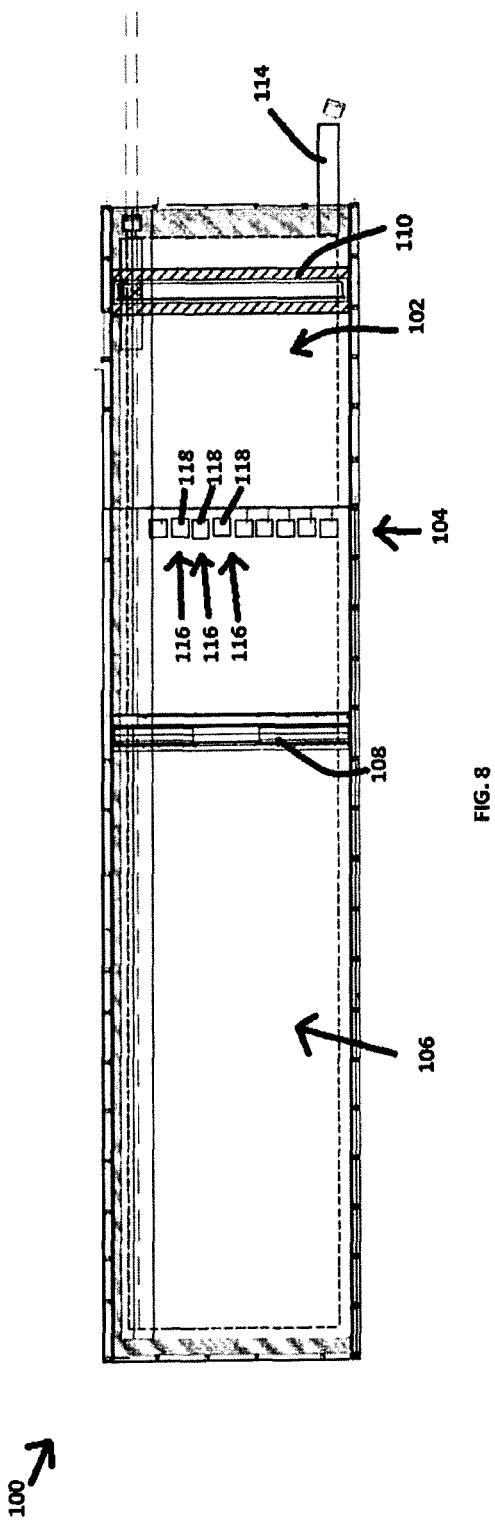

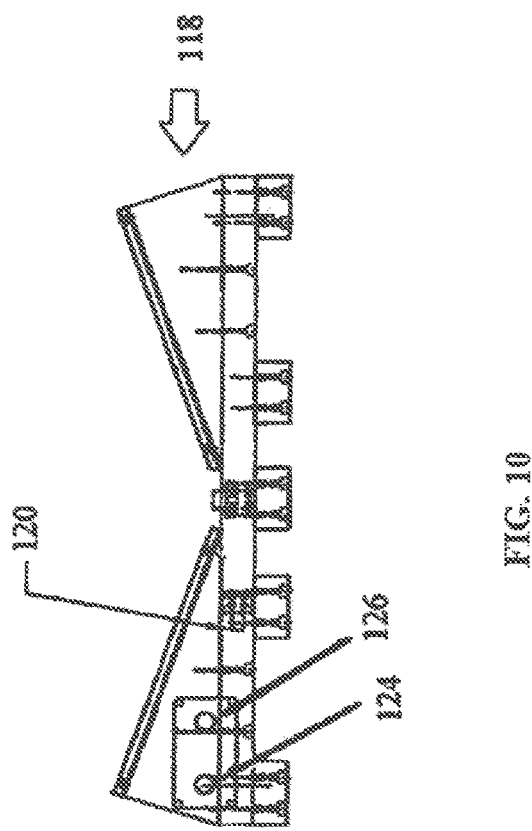
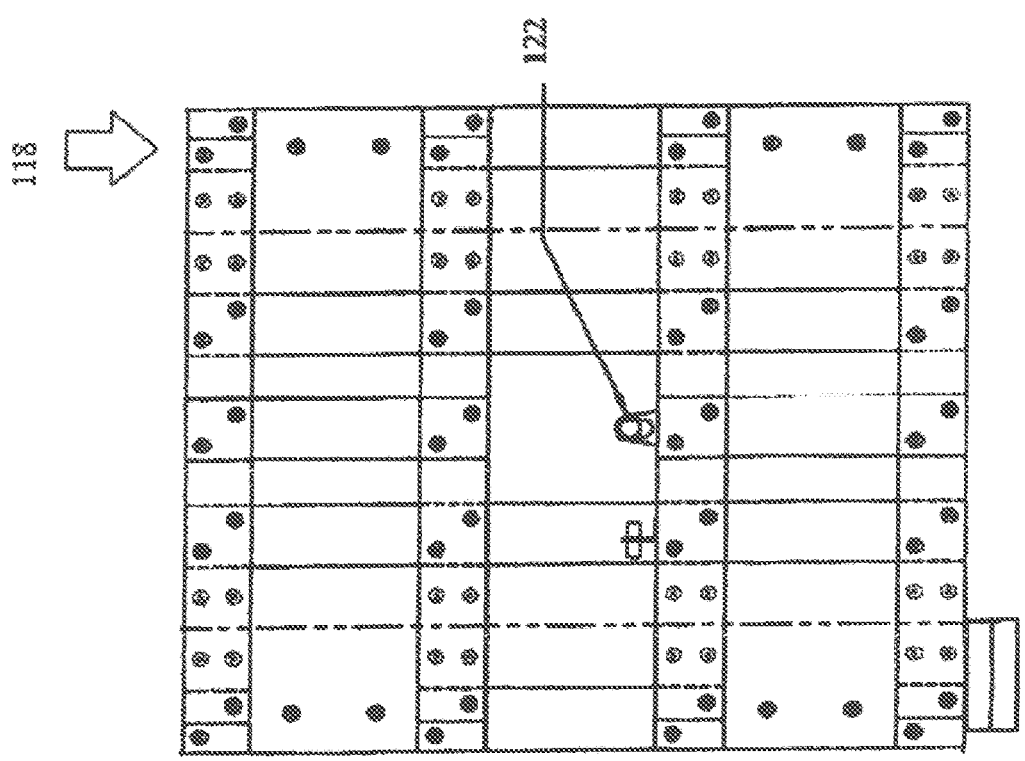

WAREHOUSE-RELATED METHOD AND FACILITY

FIELD

The field of the invention relates to warehousing.

BACKGROUND OF THE INVENTION

It is well known for coiled material, such as coils of steel, to be stored in a warehouse, and in stacks of coils two or more high. It is also well known for materials to be transported autonomously. However, it is not well known for coils to be autonomously stored in stacks of coils two or more high.

SUMMARY OF THE INVENTION

Forming one aspect of the invention is an arrangement of a plurality of coils of varying widths and diameters in a warehouse having an automated overhead crane, the overhead crane having a trolley-mounted hoist that traverses a supporting beam and a pair of rails traversed by the supporting beam, In the arrangement:
  the coil axes are parallel to one another
  the coils are arranged in lines, the widths of the coils in each line falling within a first predetermined range associated with the line, the diameters of the coils in each line falling within a second predetermined range associated with the line and the axes of the coils in each line being orientated perpendicularly to said each line
  the lines of coils being arranged to define (i) rows of coils; (ii) a bottom layer of coils; and (iii) one or more upper layers or coils,
  in respect of each coil in the one or more upper layers, said each coil is supported by a pair of adjacent coils in a line in a lower layer and
  the first and second predetermined ranges associated with the line in which said each coil is arranged are the same as those associated with the line in which the coils supporting said each coil are arranged.

According to another aspect of the invention, the rows of coils are spaced apart from one another by a predetermined clearance distance associated with the clearance of the overhead crane.

According to another aspect of the invention, in respect of each line of coils, the coil axes are spaced apart by a multiple of a predetermined spacing distance associated with the second predetermined range associated with said each line.

According to another aspect of the invention, in respect of each line of coils, the predetermined spacing distance is associated with the upper limit of the second predetermined range associated with said each line.

According to another aspect of the invention, in respect of each line of coils, the predetermined spacing distance is the sum of a constant and the upper limit of the predetermined range of diameters associated with said each line.

According to another aspect of the invention, the constant is one and the same for all lines.

According to another aspect of the invention, the constant is 2" and the coils in each line have diameters that differ by no more than 1".

According to another aspect of the invention, the lines of coils are parallel to the supporting beam and the coil axes are parallel to the rails.

Forming another aspect of the invention is a method for arranging a plurality of coils of varying widths and diameters in a warehouse having an automated overhead crane, the overhead crane having a trolley-mounted hoist that traverses a supporting beam and a pair of rails traversed by the supporting beam The method comprises an associating step, a defining step, a placement step and an arrangement step.

Association Step

In this step, associating each of the plurality of coils with one of a plurality of types such that, in respect of each type, the associated coils each have a width that falls within a first predetermined range associated with said each type and a diameter that falls within a second predetermined range associated with said each type.

Defining Step

In this step, for each coil type, defining, in the warehouse, an associated zone, the zone being defined by one or more areas on the warehouse floor, said one or more areas calculated to be sufficiently large to receive at least a number of notional coils associated with said each coil type, the number of notional coils being at least the number of coils associated with said each coil type, the notional coils having a notional width equal to the upper limit of the first predetermined range associated with said each type and having a notional diameter equal to the upper limit of the second predetermined range associated with said each type, the calculations assuming that, in respect of each coil type:
  the associated notional coils are arranged in one or more notional lines, the axes of the associated notional coils being parallel to one another and perpendicular to the notional lines and, in respect of each line, the ends of the notional coils being coplanar
  the associated notional coil axes are spaced apart by a multiple of a predetermined distance associated with the second predetermined range associated with said each type
  the notional lines of coils are arranged to define a bottom layer of notional coils and an upper layer of notional coils
  each notional coil in a layer other than the bottom layer is supported by adjacent notional coils in the bottom layer, the ends of the supported and supporting notional coils being coplanar; and
  at least two notional coils in the bottom layer support no other notional coils; or at least four notional coils in the bottom layer support no more than one notional coil; or space for a notional coil remains in the bottom layer.

The zones are defined such that, in the calculation: the notional coils define spaced-apart rows of notional coils; and at least a minimum predetermined clearance distance is provided between the notional coils in adjacent rows.

Placement Step

In this step, there are placed, in each zone, a number of portable coil cradles equal at least to the lesser of (i) the number of coils associated with that type; and (ii) the number of notional bottom coils defined in the associated zone.

Arrangement Step

In this step, the coils are arranged such that:
  each coil is disposed in the zone provided for the type of coil with which said each coil is associated;
  the coils form lines, the axes of the coils being parallel to one another and perpendicular to the lines; in respect of each line, the coil ends are substantially coplanar and the coil axes are spaced apart by a multiple of a predetermined distance associated with the second predetermined range associated with said each type;

the lines of coils define a bottom layer of coils and one or more upper layers of coils, each coil in the bottom layer being supported by a respective one of the portable cradles, each coil in the one or more upper layers being supported by adjacent coils in the layer beneath and the ends of the supported and supporting coils being substantially coplanar;

at least two coils in the bottom layer support no other coils; or at least four coils in the bottom layer support no more than one coil; or space for a coil remains in the bottom layer;

the coils define spaced-apart rows of coils; and at least a minimum predetermined clearance distance is provided between the coils in adjacent rows.

According to another aspect of the invention, the predetermined clearance distance can be associated with the clearance of the overhead crane.

According to another aspect of the invention, in respect of each line of coils, the coil axes can be spaced apart by a multiple of a predetermined spacing distance associated with the second predetermined range associated with the type of coils forming said each line.

According to another aspect of the invention, the predetermined spacing distance can be associated with the upper limit of the second predetermined range associated with the type of coils forming said each line.

According to another aspect of the invention, in respect of each line, the predetermined spacing distance can be the sum of a constant and the upper limit of the second predetermined range associated with the type of coils forming said each line.

According to another aspect of the invention, the constant is one and the same for all lines.

According to another aspect of the invention, the constant can be 2" and the coils in each line can have diameters that differ by no more than 1".

According to another aspect of the invention, the lines of coils are parallel to the supporting beam and the coil axes can be parallel to the rails.

According to another aspect of the invention, the coils can be arranged by the automated crane, each coil being placed autonomously by the automated crane in a manner wherein the speed of the coil transport is maximized as the coil travels through the warehouse and as the coil is lowered by the hoist to a predetermined elevation and thereafter the speed of the coil transport is reduced to the point that no damage is suffered, the predetermined elevation being calculated as a function of the diameter of the coil.

According to another aspect of the invention, the predetermined elevation can be calculated as a function of the diameter of the coil, the diameter itself being calculated as a function of the coil mass, coil thickness and coil width.

According to another aspect of the invention, the predetermined elevation can be calculated as function of the diameter of the coil and the diameters of supporting coils, if any, the diameter of the supporting coils being assumed to be within the second predetermined range associated with the type of coil.

Forming yet another aspect of the invention is a method for use with a row of coils in a warehouse having an automated overhead crane. The overhead crane has a trolley-mounted hoist that traverses a supporting beam and a pair of rails traversed by the supporting beam, the coils in the row being arranged in a lower layer and one or more upper layers. The row of coils includes a coil to be retrieved being disposed such that no other coils are supported thereby in the row.

This method comprises the steps of:
calculating the position of the core of the coil to be retrieved as a function of the diameter of the coil to be retrieved; and
providing for the autonomous retrieval of the coil to be retrieved via the overhead crane using the calculated core position.

According to another aspect of the invention, the position of the coil to be retrieved is calculated as a function of the diameter of the coil to be retrieved, the diameter itself being calculated as a function of the coil mass, coil thickness and coil width.

According to another aspect of the invention, the position of the coil to be retrieved can be calculated as a function of the diameter of the coil to be retrieved and the diameter of the supporting coils, the diameter of the supporting coils being assumed to be within a predetermined range associated with the type of coil to be retrieved Forming another aspect of the invention is a facility comprising a berth, a transition zone, a warehouse, a pair of overhead cranes, a database and a computing facility. The berth is to accommodate a conveyance selected from truck, train and boat, the conveyance carrying a plurality of coils, each coil carrying an identifier. The transition zone has defined therein a plurality of transition areas. The warehouse is for storing coils. One of the overhead cranes extends over the berth and the transition zone for movement of coils between the conveyance and the transition zone. The other of the overhead cranes extends over the warehouse and the transition zone for movement of coils between the transition zone and the warehouse. The database is adapted to receive information about the coils contained in the conveyance, said information containing the dimensions of the coils or information from which the coil dimensions can be calculated. The computing facility is adapted to, after a coil has been placed into a transition area: receive an identifier; cross-reference the identifier against the database; and, if the identifier matches one of the coils in the database, and there exists an appropriate location in the warehouse for the storage of that one of the coils, provide for the automatic pickup of that one of the coils by the second overhead crane and the conveyance thereof to the appropriate location.

According to another aspect of the invention, the facility can further comprise a bar code scanner and the computing facility can be adapted to communicate with the bar code scanner to receive the identifier.

According to another aspect of the invention, each transition area can be defined by a respective transfer cradle upon which any of the coils can be placed.

According to another aspect of the invention, the transfer cradle can contain an arrangement to determine if a coil has been placed thereon and relay an indication to the computing facility.

According to another aspect of the invention, the computing facility can be adapted to receive the identifier for a coil only when the arrangement indicates that the transfer cradle is in receipt of a coil.

According to another aspect of the invention, the second overhead crane can include a system for coil identification and can carry out the conveyance of a coil to the appropriate location in the warehouse only if the coil matches the identification of the coil the crane has been instructed to convey.

According to another aspect of the invention: the database can contain, in respect of each coil, details of coil width and coil packaging; the system for coil identification can comprise sensors that engage when the legs of the grab are pressed firmly against the coil walls and sensors that determine the distance between the legs; and the second overhead crane can identify a coil in its grasp by comparing the width between the legs of the grab when pressed firmly against the coil walls against
- in the case of a coil that is specified to be unpackaged, the width of the coil specified in the database;
- in the case of a coil that is specified to be packaged, a calculated width based upon the total of the width of the coil specified in the database and a predetermined amount associated with typical packaging thickness.

According to another aspect of the invention, the comparison can allows for variance of about 75 mm, to allow for coils that have been slightly telescoped in transit.

According to another aspect of the invention, the arrangement can include an optical sensor and an inductive proximity sensor.

Other advantages, features and characteristics of the present invention will become more apparent upon consideration of the following detailed description and the appended claims with reference to the accompanying drawings, the latter being briefly described hereinafter.

BRIEF DESCRIPTION OF THE DRAWINGS

FIG. 8 is a plan view showing an exemplary facility;

FIG. 9 is a top plan view of a transfer cradle according to an exemplary embodiment; and FIG. 10 is a side view of the structure of FIG. 9.

DETAILED DESCRIPTION

Figure 1:
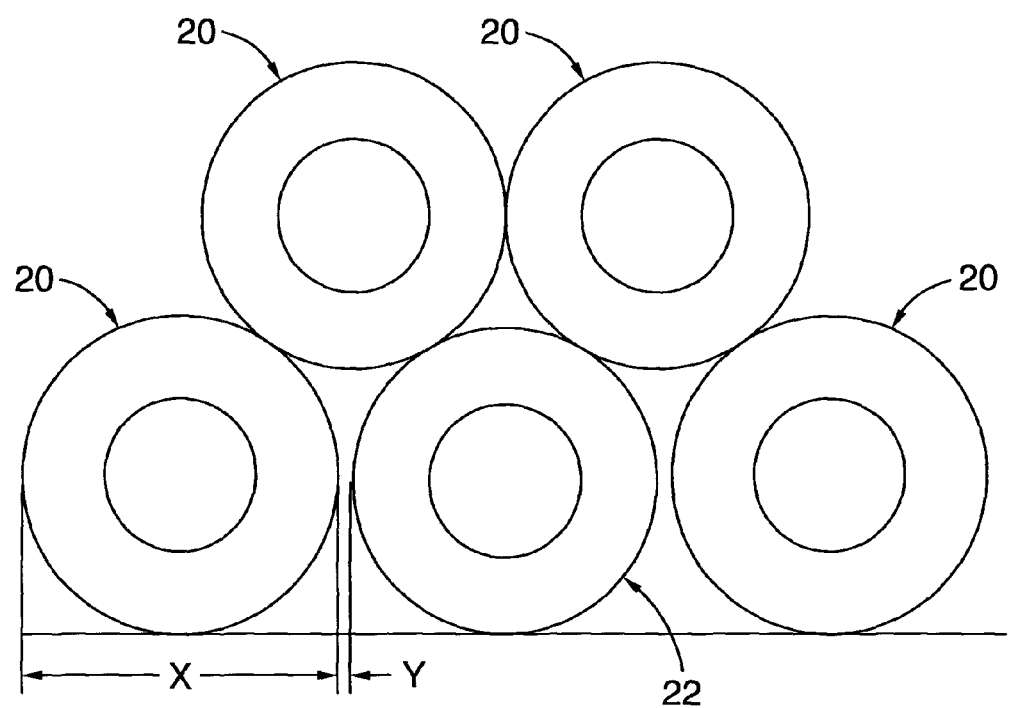
FIG. 1 is an end view of a group of coils stacked in a limit condition.

A method according to an exemplary embodiment of the invention is hereinafter described in detail.

As an initial matter, it will be understood that the method is a warehousing method for use with a warehouse, a plurality of coils and a plurality of cradles.

The warehouse is of a known type having an overhead crane (not shown). The overhead crane has a trolley-mounted hoist that traverses a supporting beam and a pair of rails traversed by the supporting beam, and is capable of autonomous operation, i.e. capable of:
- travelling to a location whereat a coil is understood to reside
- if a coil is at the location, grasping the coil; and
- transporting the coil to another location.

The coils are of:
- varying widths, i.e. the distance between the ends of the coil when measured in the direction of the coil axis varies from coil to coil; and
- varying diameter Each cradle is adapted to support a respective one of the coils such that the coil axis is horizontal.

The method is for arranging the coils in the warehouse and broadly defined, the method involves an associating step, a defining step, a placing step and an arranging step.

In the associating step, each of the plurality of coils is associated with one of a plurality of types such that, in respect of each type, the associated coils each have a width that falls within a first predetermined range associated with said each type and a diameter that falls within a second predetermined range associated with said each type.

In the defining step, a subzone is defined for and associated with each coil type in the warehouse.

Also defined in the defining step for and associated with each coil type is a notional coil. The notional coil associated with each coil type has a notional width equal to the upper limit of the first predetermined range associated with the coils of said each type and has a notional diameter equal to the upper limit of the second predetermined range associated with said each type. Thus, for a coil type encompassing widths between 60" and 66" and encompassing diameters between 40" and 41", the notional coil would have a notional width of 66" and a notional diameter of 41".

The subzone for each coil type is defined by one or more areas on the warehouse floor, said one or more areas being calculated to be sufficiently large to receive at least a number of the notional coils associated with said each coil type that is equal to the number of coils of that type on hand. Thus, if the inventory of coils to be arranged includes nine (9) coils falling within the type encompassing widths between 58" and 64" and encompassing diameters between 40" and 41", the subzone will be large enough to house nine (9) notional coils having a notional width of 64" and a notional diameter of 41".

The packing methodology by which the notional coils are assumed to occupy the subzones assumes for the purpose of the calculation contemplates that, in respect of each coil type:
- the associated notional coils are arranged in one or more notional lines that lie parallel to the supporting beam
- the coil axes are parallel to the rails
- in each line, the coil axes are parallel to one another, the notional coil ends are coplanar and the notional coil axes are spaced apart by a multiple of a predetermined distance associated with the second predetermined range associated with said each type
- the notional lines of coils are arranged to define a bottom layer of notional coils and an upper layer of notional coils
- each notional coil in a layer other than the bottom layer is supported by adjacent notional coils in the bottom layer, the ends of the supported and supporting notional coils being coplanar; and
- at least two notional coils in the bottom layer support no other notional coils; or at least four notional coils in the bottom layer support no more than one notional coil; or space for a notional coil remains in the bottom layer The predetermined spacing distance is associated with the second predetermined range associated with the type of notional coils forming said each notional line, more specifically, the predetermined distance is the sum of a constant and the upper limit of the second predetermined range associated with the type of notional coils forming said each line, the constant being one and the same for all lines. The predetermined distance is sufficiently narrow as to enable coils to be stacked upon one another in two or more levels and sufficiently broad as to ensure that, irrespective of the diameter of the coils being stacked [all coils being of the same type], the coils do not bridge one another [which would cause damage].

With further regard to the predetermined distance, reference is made to FIG. 1 which shows a group of coils in a limit condition. Coils 20 have an OD of 38"; coil 22 has an OD of 36.9"; Y is 2.55" and X is 40". This drawing illustrates that, wherein the constant is 2" [i.e. spacing between the centres of adjacent coils is $2"+OD_{max}$], $OD_{min}$ is 36.9". To state it yet another way, if the maximum differential in coil OD in a respective coil type is maintained at less than 1.1", then a 2" spacing constant will avoid bridging. This calculation changes slightly with coil sizes but it has been found that for coils having an OD between 24" and 70", maintenance of a maximum 1" OD differential in each coil type and a 2" spacing constant avoids bridging at all times.

The subzones are defined in the warehouse such that:
the notional coils define spaced-apart rows of notional coils;
notional coils of the most common types generally are placed nearer the loading areas and notional coils of the most uncommon types generally are placed further from the loading areas
notional coils are generally grouped by the first predetermined range
at least a minimum predetermined clearance distance is provided between the notional coils in adjacent rows, this distance being associated with the clearance of the overhead crane, i.e. the distance between the rows of notional coils is such that it would permit the overhead crane to traverse the rows and manipulate the coils.

The foregoing arrangement will be understood to be advantageous in that: (1) coil movement activity will normally be more commonplace in the context of coils of popular types; thus, the placement of these coils near the loading bay expedites movement; and (2) in areas where large subzones are created, i.e. where large numbers of similar coils are on hand or expected, the likelihood of the need for the creation of a new subzone is relatively small, whereas in the context of relatively "rare" coil types, the chance of significant variance in length heightens [i.e. if a subzone contains only a couple of coils, the removal of those coils opens up the potential for an entirely new subzone; (3) grouping the coils together by the first predetermined range tends to reduce wasted space, i.e. space would be wasted if coils having large widths were commonly stored alongside coils having narrow widths.

In the placement step, for each type of coil, a number of portable coil cradles equal at least to the lesser of (i) the number of coils associated with that type; and (ii) the number of notional bottom coils defined in the associated subzone, are operatively placed in the areas defined on the warehouse floor.

In the arrangement step, the physical coils are arranged such that:
each coil is disposed in the subzone provided for the type of coil with which said each coil is associated
the coils form lines parallel to the supporting beam, the axes of the coils being parallel to one another and to the rails and perpendicular to the lines
in respect of each line, the coil ends are substantially coplanar and the coil axes are spaced apart by a multiple of a predetermined distance associated with the second predetermined range associated with said each type
the lines of coils define a bottom layer of coils and one or more upper layers of coils
each coil in the bottom layer is supported by a respective one of the portable cradles
each coil in the one or more upper layers is supported by adjacent coils in the layer beneath, the ends of the supported and supporting coils being substantially coplanar; and
at least two coils in the bottom layer support no other coils; or at least four coils in the bottom layer support no more than one coil; or space for a coil remains in the bottom layer.

The coils are arranged by the automated crane, each coil being placed autonomously by the automated crane:
into the subzone provided for the type of coil with which said each coil is associated;
in the bottom layer, if space exists; and
in a manner wherein the speed of the coil transport is maximized as the coil travels through the warehouse and as the coil is lowered by the hoist to a predetermined elevation and thereafter the speed of the coil transport is reduced to the point that no damage is suffered, the predetermined elevation being calculated as a function of the diameter of the coil.

A prophetic example is hereinafter described in detail with reference to the Tables reproduced below and the Figures.

Figure 2:
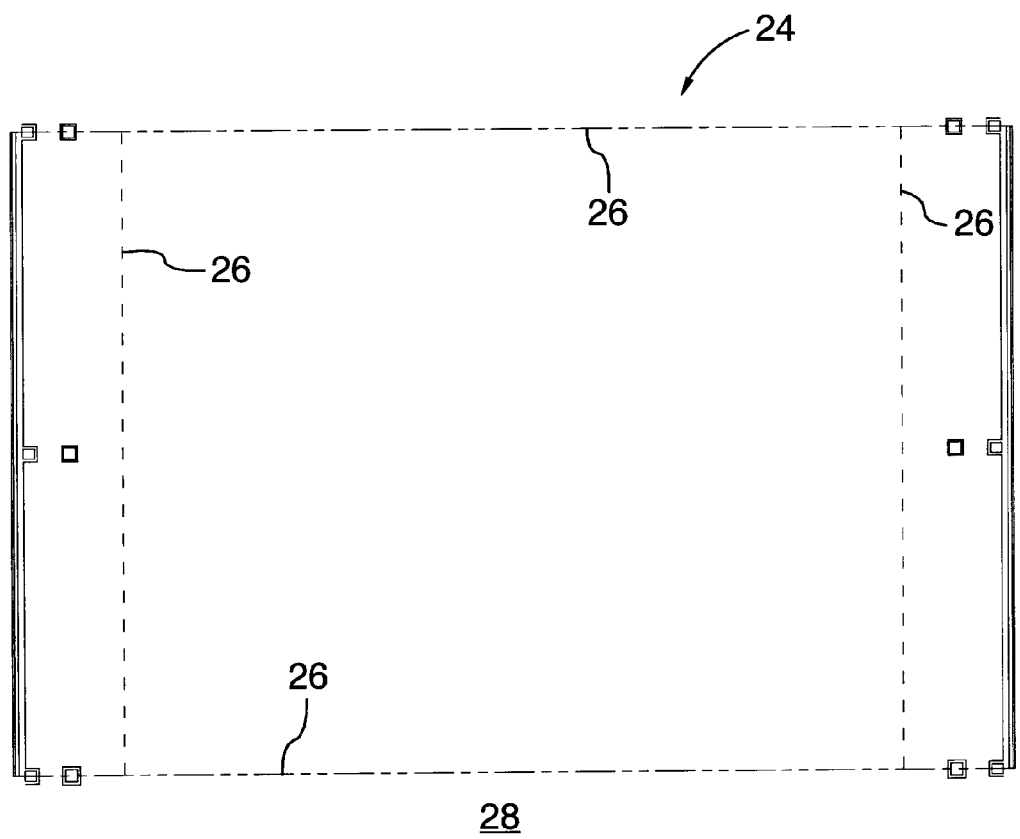
FIG. 2 is a plan view showing a layout of an exemplary warehouse

FIG. 2 shows the layout and square footage of an exemplary warehouse 24. The limits of the hoist travel are defined by dashed lines 26. The loading bay is indicated by area 28.

TABLE 1 reproduced below, shows a hypothetic inventory of coils.

| COIL No | Gauge | Width | Weight (lbs) | OD (inch) |
|---|---|---|---|---|
| XK13160540 | 0.63 | 49.21 | 6658 | 31.52 |
| XK13160570 | 0.63 | 49.21 | 6658 | 31.52 |
| XK11300410 | 0.63 | 49.21 | 6703 | 31.58 |
| XK13180620 | 0.65 | 49.21 | 6857 | 31.79 |
| ANL490A | 0.63 | 49.21 | 6914 | 31.87 |
| XK0C280190 | 0.65 | 48.43 | 11553 | 38.03 |
| XK0C280290 | 0.65 | 48.43 | 11663 | 38.16 |
| XK0C280250 | 0.65 | 48.43 | 11839 | 38.37 |
| 245967 | 0.85 | 49.21 | 12069 | 38.41 |
| F0K0430C04 | 0.465 | 47.56 | 13074 | 40.07 |
| F0H0537C01 | 0.465 | 47.56 | 13096 | 40.09 |
| F0I0560C03 | 0.465 | 47.56 | 13096 | 40.09 |
| F0J0428C01 | 0.465 | 47.56 | 13096 | 40.09 |
| 110205375001C | 0.85 | 59.06 | 16425 | 40.24 |
| 110205356001C | 0.75 | 59.06 | 16425 | 40.24 |
| 110205376001C | 0.85 | 59.06 | 16425 | 40.24 |
| 110205352001C | 0.75 | 59.06 | 16425 | 40.24 |
| 110205375002C | 0.85 | 59.06 | 16425 | 40.24 |
| JKFK0AC | 0.70 | 39.37 | 14273 | 44.60 |
| JLAG3B | 0.70 | 39.37 | 14286 | 44.62 |
| JLFN9BA | 0.85 | 39.37 | 14286 | 44.62 |
| AB762C | 0.48 | 39.37 | 14286 | 44.62 |
| BPY379A | 0.40 | 39.37 | 14291 | 44.63 |
| 006452D1L | 0.70 | 59.06 | 32045 | 52.72 |
| 006392D1L | 0.75 | 59.06 | 32056 | 52.73 |
| 006422D1L | 0.75 | 59.06 | 32111 | 52.76 |
| 010692D1L | 0.90 | 59.06 | 32177 | 52.81 |
| 006482D1L | 0.70 | 59.06 | 32188 | 52.82 |
| 0PB348A00 | 1.45 | 49.61 | 32320 | 57.07 |
| 0PB351A00 | 1.45 | 49.61 | 32342 | 57.08 |
| 0PB349A00 | 1.45 | 49.61 | 32386 | 57.12 |
| 01L040X00 | 2.45 | 49.02 | 41679 | 64.75 |
| 16L392A00 | 1.25 | 43.31 | 37424 | 64.72 |

TABLE 1-continued reproduced below, shows a hypothetic inventory of coils.

| COIL No | Gauge | Width | Weight (lbs) | OD (inch) |
|---|---|---|---|---|
| 09M740X00 | 1.25 | 43.31 | 37479 | 64.76 |
| 09M742X00 | 1.25 | 43.31 | 37578 | 64.84 |
| 9CM667X00 | 1.55 | 43.31 | 37600 | 64.86 |
| 09M741X00 | 1.25 | 43.31 | 37600 | 64.86 |
| 09M735X00 | 1.25 | 43.31 | 37600 | 64.86 |
| 09M730X00 | 1.25 | 43.31 | 37666 | 64.91 |
| 01L039X00 | 2.45 | 49.02 | 42969 | 65.14 |
| 01L037X00 | 2.45 | 49.02 | 43002 | 65.17 |

TABLE 2 reproduced below, shows the result of the association step, with the first predetermined range between 6" and the second predetermined range being 1"

| COIL No | Gauge | Width | Weight (lb) | OD (in) | OD Sub-class | Width sub-class |
|---|---|---|---|---|---|---|
| XK13160540 | 0.63 | 49.21 | 6658 | 31.52 | 32 | D |
| XK13160570 | 0.63 | 49.21 | 6658 | 31.52 | 32 | D |
| XK11300410 | 0.63 | 49.21 | 6703 | 31.58 | 32 | D |
| XK13180620 | 0.65 | 49.21 | 6857 | 31.79 | 32 | D |
| ANL490A | 0.63 | 49.21 | 6914 | 31.87 | 32 | D |
| XK0C280190 | 0.65 | 48.43 | 11553 | 38.03 | 38 | D |
| XK0C280290 | 0.65 | 48.43 | 11663 | 38.16 | 38 | D |
| XK0C280250 | 0.65 | 48.43 | 11839 | 38.37 | 38 | D |
| 245967 | 0.85 | 49.21 | 12069 | 38.41 | 38 | D |
| F0K0430C04 | 0.465 | 47.56 | 13074 | 40.07 | 40 | D |
| F0H0537C01 | 0.465 | 47.56 | 13096 | 40.09 | 40 | D |
| F0I0560C03 | 0.465 | 47.56 | 13096 | 40.09 | 40 | D |
| F0J0428C01 | 0.465 | 47.56 | 13096 | 40.09 | 40 | D |
| 110205375001C | 0.85 | 59.06 | 16425 | 40.24 | 40 | F |
| 110205356001C | 0.75 | 59.06 | 16425 | 40.24 | 40 | F |
| 110205376001C | 0.85 | 59.06 | 16425 | 40.24 | 40 | F |
| 110205352001C | 0.75 | 59.06 | 16425 | 40.24 | 40 | F |
| 110205375002C | 0.85 | 59.06 | 16425 | 40.24 | 40 | F |
| JKFK0AC | 0.70 | 39.37 | 14273 | 44.60 | 45 | B |
| JLAG3B | 0.70 | 39.37 | 14286 | 44.62 | 45 | B |
| JLFN9BA | 0.85 | 39.37 | 14286 | 44.62 | 45 | B |
| AB762C | 0.48 | 39.37 | 14286 | 44.62 | 45 | B |
| BPY379A | 0.40 | 39.37 | 14291 | 44.63 | 45 | B |
| 006452D1L | 0.70 | 59.06 | 32045 | 52.72 | 53 | F |
| 006392D1L | 0.75 | 59.06 | 32056 | 52.73 | 53 | F |
| 006422D1L | 0.75 | 59.06 | 32111 | 52.76 | 53 | F |
| 010692D1L | 0.90 | 59.06 | 32177 | 52.81 | 53 | F |
| 006482D1L | 0.70 | 59.06 | 32188 | 52.82 | 53 | F |
| 0PB348A00 | 1.45 | 49.61 | 32320 | 57.07 | 57 | D |
| 0PB351A00 | 1.45 | 49.61 | 32342 | 57.08 | 57 | D |
| 0PB349A00 | 1.45 | 49.61 | 32386 | 57.12 | 57 | D |
| 01L040X00 | 2.45 | 49.02 | 41679 | 64.75 | 65 | D |
| 16L392A00 | 1.25 | 43.31 | 37424 | 64.72 | 65 | C |
| 09M740X00 | 1.25 | 43.31 | 37479 | 64.76 | 65 | C |
| 09M742X00 | 1.25 | 43.31 | 37578 | 64.84 | 65 | C |
| 9CM667X00 | 1.55 | 43.31 | 37600 | 64.86 | 65 | C |
| 09M741X00 | 1.25 | 43.31 | 37600 | 64.86 | 65 | C |
| 09M735X00 | 1.25 | 43.31 | 37600 | 64.86 | 65 | C |
| 09M730X00 | 1.25 | 43.31 | 37666 | 64.91 | 65 | C |
| 01L039X00 | 2.45 | 49.02 | 42969 | 65.14 | 65 | D |
| 01L037X00 | 2.45 | 49.02 | 43002 | 65.17 | 65 | D |

For ready reference, each subzone in the table above is an alpha numeric: the alphabetic represents a zone defined by the first predetermined range [width, where A is 28-34", B is 34-40", etc.] and the numeric is indicative of the second predetermined range [32 is 32±0.5", 33 is 33±0.5", etc.]

TABLE 3 reproduced below, shows an interim stage of the defining step, wherein the coils are grouped.

| | Class | | | | | | |
|---|---|---|---|---|---|---|---|
| Sub-class | A (28-34) | B (34-40) | C (40-46) | D (46-52) | E (52-58) | F (58-64) | G (64-70) |
| 32 | 0 | 0 | 0 | 5 | 0 | 0 | 0 |
| 33 | 0 | 0 | 0 | 0 | 0 | 0 | 0 |
| 34 | 0 | 0 | 0 | 0 | 0 | 0 | 0 |
| 35 | 0 | 0 | 0 | 0 | 0 | 0 | 0 |
| 36 | 0 | 0 | 0 | 0 | 0 | 0 | 0 |
| 37 | 0 | 0 | 0 | 0 | 0 | 0 | 0 |
| 38 | 0 | 0 | 0 | 4 | 0 | 0 | 0 |
| 39 | 0 | 0 | 0 | 0 | 0 | 0 | 0 |
| 40 | 0 | 0 | 0 | 4 | 0 | 5 | 0 |
| 41 | 0 | 0 | 0 | 0 | 0 | 0 | 0 |
| 42 | 0 | 0 | 0 | 0 | 0 | 0 | 0 |
| 43 | 0 | 0 | 0 | 0 | 0 | 0 | 0 |
| 44 | 0 | 0 | 0 | 0 | 0 | 0 | 0 |
| 45 | 0 | 5 | 0 | 0 | 0 | 0 | 0 |
| 46 | 0 | 0 | 0 | 0 | 0 | 0 | 0 |
| 47 | 0 | 0 | 0 | 0 | 0 | 0 | 0 |
| 48 | 0 | 0 | 0 | 0 | 0 | 0 | 0 |
| 49 | 0 | 0 | 0 | 0 | 0 | 0 | 0 |
| 50 | 0 | 0 | 0 | 0 | 0 | 0 | 0 |
| 51 | 0 | 0 | 0 | 0 | 0 | 0 | 0 |
| 52 | 0 | 0 | 0 | 0 | 0 | 0 | 0 |
| 53 | 0 | 0 | 0 | 0 | 0 | 5 | 0 |
| 54 | 0 | 0 | 0 | 0 | 0 | 0 | 0 |
| 55 | 0 | 0 | 0 | 0 | 0 | 0 | 0 |
| 56 | 0 | 0 | 0 | 0 | 0 | 0 | 0 |
| 57 | 0 | 0 | 0 | 3 | 0 | 0 | 0 |
| 58 | 0 | 0 | 0 | 0 | 0 | 0 | 0 |
| 59 | 0 | 0 | 0 | 0 | 0 | 0 | 0 |
| 60 | 0 | 0 | 0 | 0 | 0 | 0 | 0 |
| 61 | 0 | 0 | 0 | 0 | 0 | 0 | 0 |
| 62 | 0 | 0 | 0 | 0 | 0 | 0 | 0 |
| 63 | 0 | 0 | 0 | 0 | 0 | 0 | 0 |
| 64 | 0 | 0 | 0 | 0 | 0 | 0 | 0 |
| 65 | 0 | 0 | 7 | 3 | 0 | 0 | 0 |
| TOTALS | 0 | 5 | 7 | 19 | 0 | 10 | 0 |

TABLE 4 reproduced below, shows another interim stage, wherein warehouse space is allocated based on the greater of coils in inventory and average number of coils in inventory.

| Class | Subclass | In Inventory | Average Spots | Actual Spots | Free Spots |
|---|---|---|---|---|---|
| B | 45 | 5 | 9 | 11 | 4 |
| C | 65 | 7 | 5 | 9 | 0 |
| D | 32 | 5 | 0 | 7 | 0 |
| | 38 | 4 | 4 | 6 | 0 |
| | 40 | 4 | 5 | 7 | 1 |
| | 57 | 3 | 12 | 14 | 9 |
| | 65 | 3 | 3 | 5 | 0 |
| F | 40 | 5 | 8 | 10 | 3 |
| | 53 | 5 | 0 | 7 | 0 |

Herein, it will be seen that, for each subzone [defined by a class and subclass] space is allocated on the warehouse floor assuming a number of notional spots [Actual spots] that is 2 greater than the greater of the number of coils in inventory and the average number of coils in inventory. This ensures that there are always two open spots in each zone for the reasons indicated earlier, namely, so as to ensure that, when a coil in the lower layer needs to be retrieved, that coil being disposed beneath one or more other coils in a stack, there is room nearby to temporarily store the supported coils as the coil to be retrieved is unearthed. This adds to efficiencies within the warehouse.

For greater certainty, it will be appreciated that the concept of "two open spaces" in the context of two layers of coils is embodied by the following relationship in respect of each zone: at least two coils in the bottom layer support no other coils; or at least four coils in the bottom layer support no more than one coil; or space for a coil remains in the bottom layer.

With regard to the "average" number of coils on hand in inventory, persons of ordinary skill in the statistical arts can generate an "average" number of coils in inventory based on historic norms and trends using a multitude of conventional statistical tools. This prediction forms no part of the present invention and accordingly is not described in detail.

Figure 3:
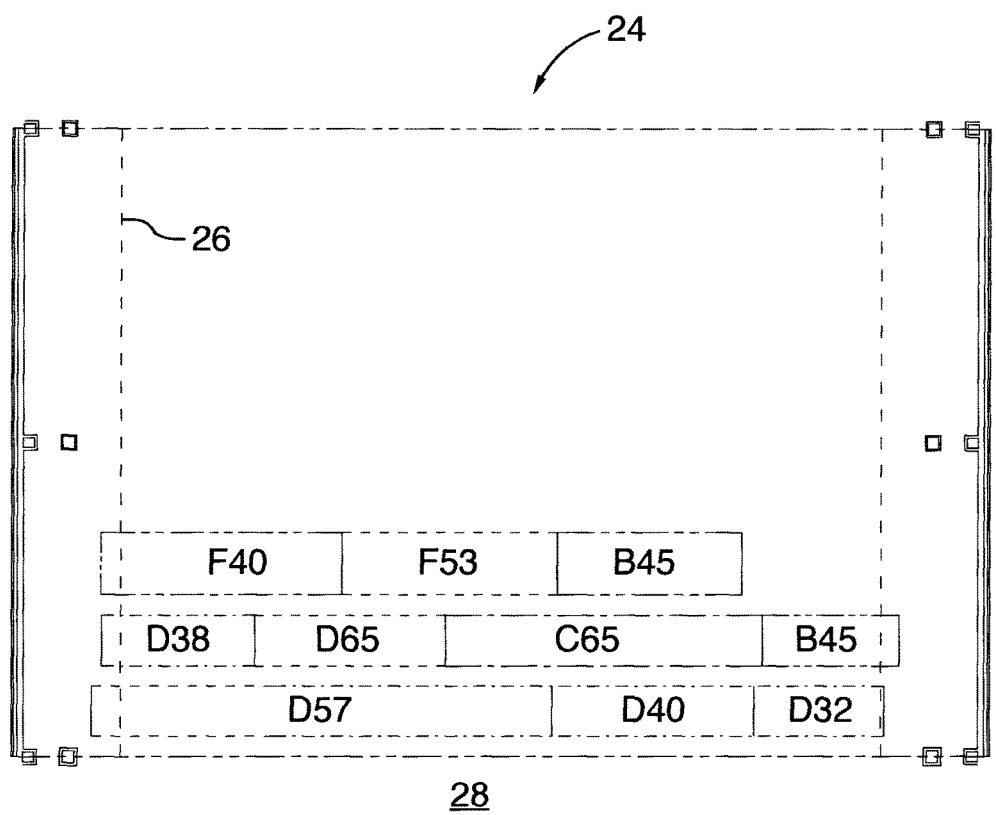
FIG. 3 is a view similar to FIG. 2, with subzones defined thereon

FIG. 3 shows the subzones defined on the warehouse floor, with each boundary labelled with the appropriate subzone.

The placement of the subzones on the warehouse floor can be explained as follows:

Class D has the largest number of spots associated therewith, and in class D, the largest number of spots is associated with D57. Thus, the subzone associated with D57 is situate in the row nearest the loading bay 28.

D32 and D40 are the next largest subzones, each encompassing 7 spots, but D40 is historically larger than D32. Accordingly, D40 takes priority, and is situated alongside D57; D32 is situated alongside D40. No other coils of any size can fit alongside D32, and thus, this row ends.

The next row is started by D38, being the next largest subzone in class D, encompassing 6 spots, followed by D65, with 5 spots. This completes the placement of subzones of class D.

Room exists alongside D65, and the class next largest in quantity, and of lesser with, than class D, is class C. C65 is thus placed alongside D65. This completes the placement of subzones of class C.

Room exists alongside C65, and the class next largest in quantity, and of lesser with, than class C, is class B. A portion of B45 is thus placed alongside C65. No other coils of any size can fit alongside this portion of the subzone for B45, and thus, this row ends.

The next full row is started with the notional coils of the largest class, by quantity, remaining, namely, Class F. F40 encompasses 10 spots, and thus is placed first, followed by F53. This completes the placement of zones of class F. Room exists alongside F53. The class next largest in quantity, and of lesser with, than class F, is class B. The remainder of B45 is thus placed alongside F53.

Figure 4:
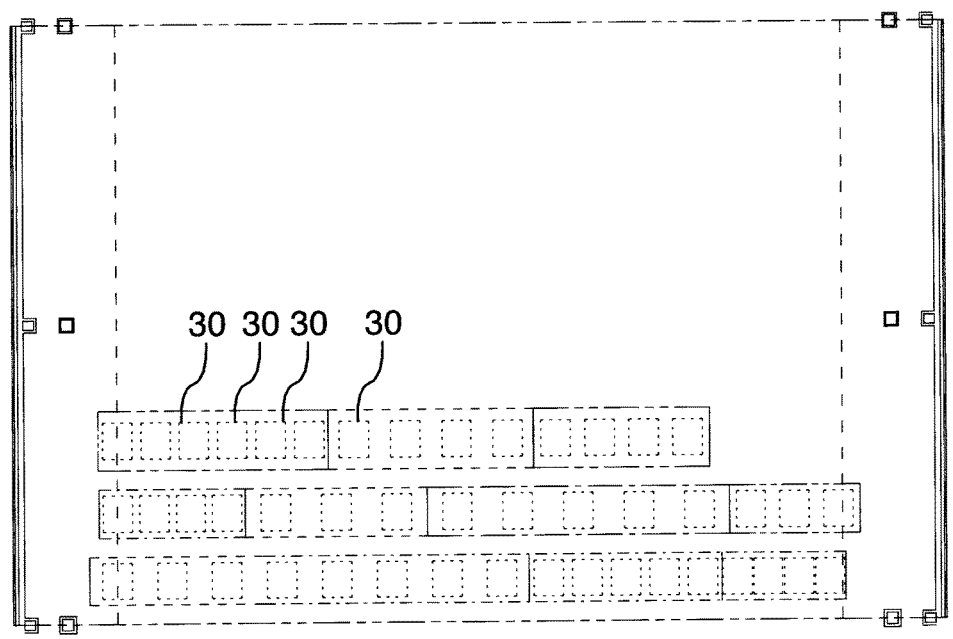
FIG. 4 is a view similar to FIG. 3 following a placing step

FIG. 4 shows the cradles 30 following the placing step.

Figure 5:
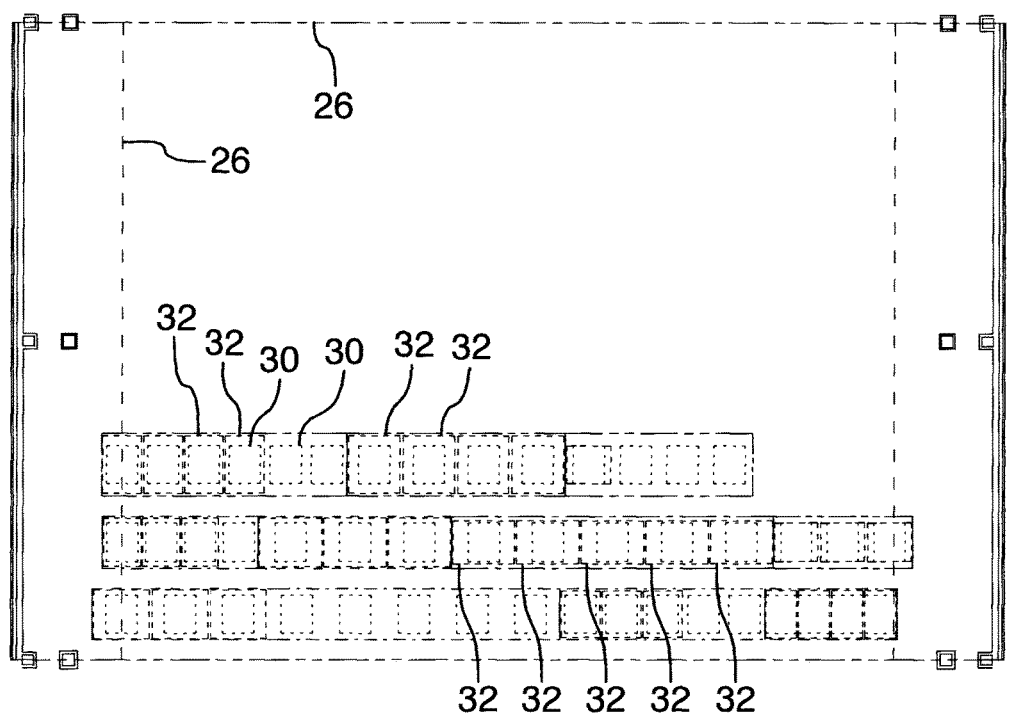
FIG. 5 is a view similar to FIG. 4 following an arrangement step, with a second layer of coils not visible.

FIG. 5 shows the warehouse floor following the arrangement step, with the second layer of coils not shown, for clarity.

Figure 6:
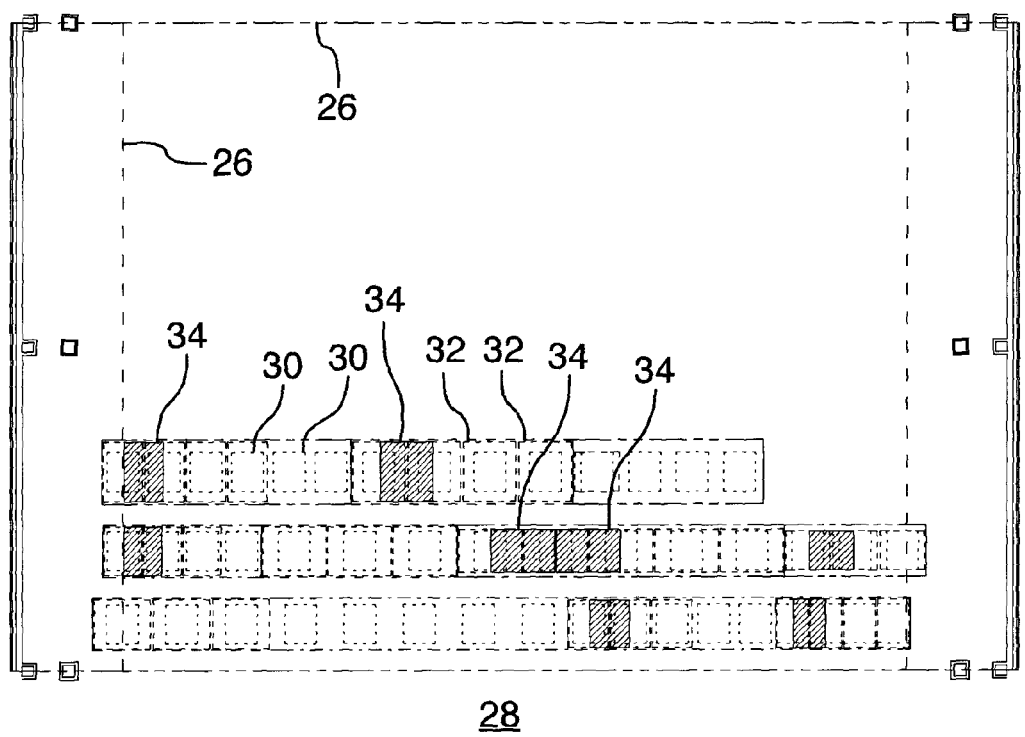
FIG. 6 is a view similar to FIG. 4 following the arrangement step.

FIG. 6 shows the warehouse floor following the arrangement step: coils in the bottom layer are indicated with reference numeral 32; coils in the upper layer are indicated with reference numeral 34; cradles remain labelled with reference numerals 30. For greater certainty, each of the dashed rectangles that define a zone or part of a zone contains one of the aforementioned lines of coils in the bottom layer and another of the forementioned lines of coils in the top layer.

The aforedescribed method and arrangement provide significant advantages.

One advantage relates to the arrangement of the coils by the automated crane (not shown).

More specifically, the coils can be placed autonomously by the automated crane in a manner wherein the speed of the coil transport is maximized as the coil travels through the warehouse and at the same time, coil damage is minimized.

To do so, the crane autonomously carries each coil, at maximum speed, into position above a desired location and the coil is lowered at maximum speed until the coil reaches a predetermined elevation, at which point, the speed of the hoist is reduced and the coil is lowered at low speed into rest.

The predetermined elevation in respect of each location is a function of:

the effective height of the cradle the diameter of the coil being transported the diameter of the supporting coils, if any the tolerance of the crane [hoist and trolley]

which ensures that the lower circumference of the coil being deposited does not come into contact with any surface below.

Figure 7:
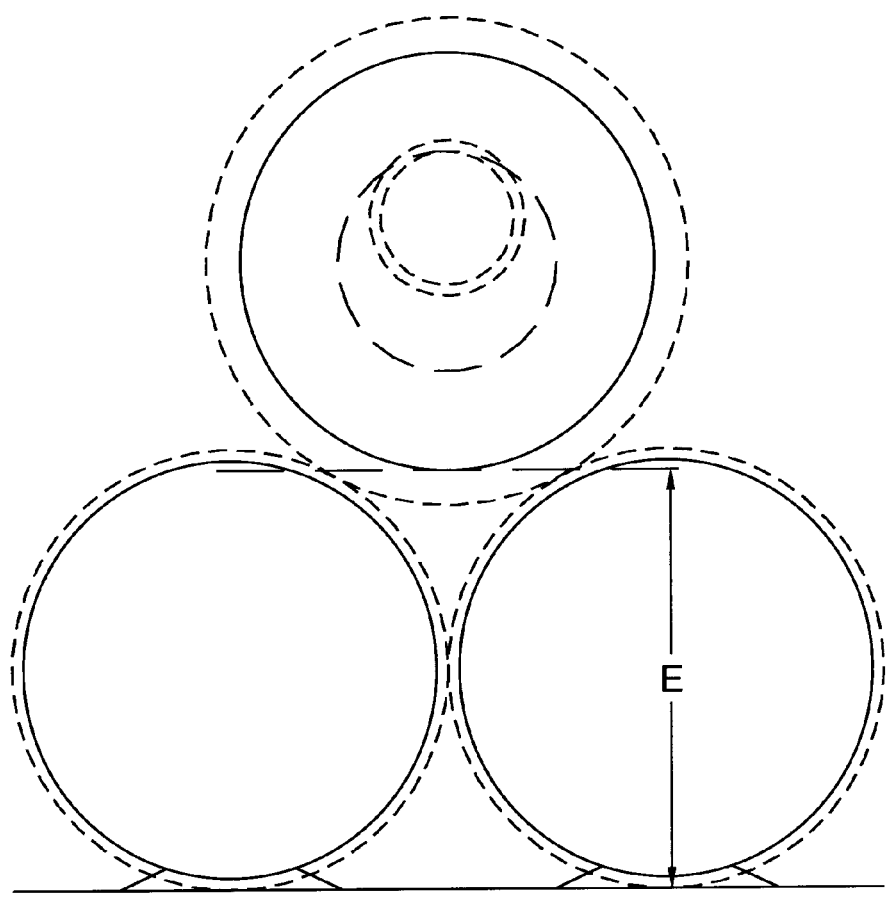
FIG. 7 is an end view of a group of coils.

A graphical representation showing the predetermined elevation E is shown as FIG. 7; the solid lines show the locations of the coils as calculated by the crane; the phantom lines indicate the potential for error. It will be seen for the purpose of the calculation that the diameters of the supporting coils are assumed to be the diameter of the notional coils.

Another advantage is associated with the retrieval of a coil.

More specifically, the coils can be retrieved autonomously by the automated crane.

To do so, the crane automatically travels, into position above the coil to be retrieved. Movement to a target will typically begin with a slow speed as the crane leaving the starting destination, transition to a faster speed and then a reduction in speed as the target approaches. At the target destination, the grapple drops, initially slowly, then faster, then slower, until the grapple reaches a predetermined elevation aligned with the position of the core in the coil to be retrieved. As the grab arm nears the coil, it will move slowly, to permit the photo eye on the grab arm to detect the edge of the coil. Once the edge has been detected the hoist will speed up to medium speed until the photo eye again detects an opening for the eye of the coil. At this point is goes into a crawl speed until it arrives at its target location for the coil. At this point, the coil is engaged by the grapple, and the coil is transported to its next location.

This predetermined elevation is again a function of:

the effective height of the cradle the diameter of the coil being retrieved the diameter of the supporting coils, if any the tolerance of the crane [hoist and trolley]

The predetermined elevation is calculated in an analogous fashion as indicated above, and thus, no further description is provided nor required.

In an exemplary embodiment, the crane and grapple speed are varied automatically using a speed profile based upon distance to be travelled, the mass of the coil and, in the case of the grapple, the direction of movement. Succinctly, the coils are caused to move at relatively lower speeds at the beginning and end of the trip [both horizontal and vertical] and at relatively higher speeds at the midpoint of the trip and the rate of speed change is higher for heavier coils than lighter coils.

Exemplary speed profiles that have been successfully used in one application are shown in Tables 5-8.

TABLE 5

Cross Travel Trolley

| Distance (mm) | Speed (Hz) |
|---|---|
| Empty | |
| 100 | 400 |
| 200 | 700 |
| 300 | 800 |
| 500 | 1000 |
| 1000 | 3000 |
| 1500 | 4000 |
| 2000 | 7000 |
| 3000 | 8500 |
| Full | |
| 150 | 200 |
| 300 | 500 |
| 400 | 700 |
| 600 | 1000 |
| 1000 | 3000 |
| 1500 | 4000 |
| 2000 | 6000 |
| 3000 | 7000 |

Table 5 shows the speed of the trolley (motor speed being a proxy for trolley speed) as a function of the location of the trolley and for "empty" and "full" trolleys, "empty" meaning loads less than 10 metric tons and "full" meaning all other loads. The acceleration profile will be understood to be the same as the deceleration profile. Thus, in the first half of the trip, the speed will be a function of the distance of the trolley from the starting position; in the second half of the trip, the speed will be a function of the distance of the trolley from the ending position.

TABLE 6

Bridge

| Distance (mm) | Speed (Hz) |
|---|---|
| Empty | |
| 100 | 150 |
| 175 | 200 |
| 500 | 1000 |
| 750 | 2000 |
| 1500 | 3000 |
| 3000 | 6000 |
| 10000 | 8500 |
| 15000 | 8500 |
| Full | |
| 100 | 150 |
| 175 | 200 |
| 500 | 300 |
| 1000 | 2000 |
| 2000 | 3000 |
| 4000 | 6000 |
| 10000 | 8500 |
| 15000 | 8500 |
| Full Heavy | |
| 100 | 150 |
| 175 | 200 |
| 500 | 300 |
| 1000 | 1200 |
| 3000 | 2000 |
| 5000 | 3000 |
| 10000 | 5000 |
| 20000 | 7000 |

Table 6 shows the speed of the bridge (motor speed again being a proxy bridge speed) as a function of the location of the bridge and for "empty", "full" and "full heavy" bridges. Herein, again, "empty" means loads less than 10 metric tons; "full" is loads between 10 and 24 metric tons and "full heavy" is loads greater than 24 metric tons. Again, the acceleration profile will be understood to be the same as the deceleration profile. Thus, in the first half of the trip, the speed will be a function of the distance of the bridge from the bridge starting position; in the second half of the trip, the speed will be a function of the distance of the bridge from the bridge ending position.

TABLE 7

Hoist

| Distance (mm) | Speed (Hz) |
|---|---|
| Empty | |
| 100 | 600 |
| 375 | 3000 |
| 750 | 6000 |
| 1200 | 6000 |
| 3000 | 8500 |
| 3000 | 8500 |
| 3000 | 8500 |
| 3000 | 8500 |
| Raise Full | |
| 50 | 600 |
| 175 | 3000 |
| 500 | 4000 |
| 600 | 4000 |
| 750 | 4000 |
| 1000 | 6000 |
| 3000 | 8500 |
| 4000 | 1000 |
| Lower Full | |
| 450 | 300 |
| 600 | 600 |
| 750 | 1500 |
| 1000 | 3000 |
| 1800 | 8500 |
| 3800 | 8500 |
| 5000 | 6000 |
| 6000 | 6000 |
| Raise Full Heavy | |
| 100 | 600 |
| 450 | 800 |
| 1200 | 2500 |
| 1900 | 5000 |
| 2500 | 5400 |
| 3000 | 4470 |
| 3500 | 2000 |
| 4000 | 500 |
| Lower Full Heavy | |
| 450 | 300 |
| 600 | 600 |
| 750 | 800 |
| 1000 | 1200 |
| 1500 | 3000 |
| 2000 | 5000 |
| 3000 | 6000 |
| 5000 | 6000 |
| Raise Full Heavy ($2^{nd}$ Level) | |
| 100 | 600 |
| 450 | 800 |
| 770 | 2500 |
| 970 | 4200 |
| 1360 | 47200 |
| 1670 | 4500 |
| 2000 | 2000 |
| 2500 | 500 |

Table 7 shows the speed of the hoist (motor speed again being a proxy for hoist speed) as a function of the location of the hoist, the mass of the load and the direction of the hoist, i.e. whether raising or lowering. Empty is the speed profile of the hoist, when either raising or lowering, when the load is less than 10 metric tons. Raise Full is the speed profile of the hoist, when raising, when the load is between 10 and 24 metric tons. Lower Full is the speed profile of the hoist, when lowering, when the load is between 10 and 24 metric tons. Raise Full Heavy is the speed profile of the hoist, when raising, when the load is above 24 metric tons. Lower Full Heavy is the speed profile of the hoist, when lowering, when the load is above 24 metric tons. Raise Full Heavy ($2^{nd}$ Level) is the speed profile of the hoist, when raising a load above 24 metric tons from the second level. Again, the acceleration profile will be understood to be the same as the deceleration profile. Thus, in the first half of the trip, the speed will be a function of the distance of the hoist from the bridge starting position; in the second half of the trip, the speed will be a function of the distance of the hoist from the hoist ending position.

Whereas specific speed profiles are shown above, persons of ordinary skill will appreciate that these are for example, only. Speed profiles will vary depend, inter alia, upon tolerances of the crane, and advantageous speed profiles for any given crane can be ascertained by routine experimentation to minimize sway.

FIG. 8 shows an exemplary facility 100 for carrying out the method which forms another aspect of the invention.

The exemplary facility comprises, as shown, a berth 102, a transition zone 104, a warehouse 106 and a pair of overhead cranes 108,110, and also comprises, not shown, a database and a computing facility.

The berth 102 accommodates one or more conveyances selected from truck, train and boat, the conveyance carrying a plurality of coils (not shown), each coil carrying an identifier. In this case, the berth 102 will be seen to be accommodating a conveyance in the form of a truck 114.

The transition zone 104 has defined therein a plurality of transition areas 116. Each transition area is defined by a respective transfer cradle 118 upon which any of the coils can be placed. The transfer cradle 118, as shown in FIG. 9, contains an arrangement, in the form of an optical sensor 120 and an inductive proximity sensor 122, to determine if a coil has been placed thereon and relay an indication to the computing facility. The transfer cradle also has a green light 124 and a red light 126.

The warehouse 106 is for storing coils in the aforedescribed manner.

One of the overhead cranes 110 extends over the berth 102 and the transition zone 104 for movement of coils between the conveyance and the transition zone 104. In this facility, this crane 110 is manually operated, using conventional controls.

The other of the overhead cranes 108 extends over the warehouse 106 and the transition zone 104 for movement of coils between the transition zone 104 and the warehouse 106. This crane 108 is capable of autonomous operation and has sensors (not shown) that engage when the legs of the grab (not shown) are pressed firmly against the walls of a coil and sensors (not shown) that determine the distance between the legs.

The database is adapted to receive information about the coils contained in the conveyance, said information containing the dimensions of the coils or information from which the coil dimensions can be calculated.

In use, the database receives a database of steel coil information which travels with the coils:
Coil Identifier
Coil Gauge (thickness)
Coil Width
Coil Packaging
Coil Outside Diameter
Coil Inside Diameter
Oiled or Dry
Material Type
Customer Identifier Automated Coil Put Away When sending coils to the warehouse, an operator initiates the operation via a scanner (not shown).

The operator will manually place a coil from the conveyance on a transfer cradle that is free. This is determined by the green and red operating lights on the front of each transfer cradle. If the cradle has a flashing red light, then the cradle has already been selected for an automated operation and cannot be used. If the operator ignores this visual cue and still places the coil on the cradle, the sensors built into the cradle will sense that the cradle is occupied and cause the automation to fault out until it is removed.

Once the coil has been placed on a free transfer cradle, the operator will scan the barcode on the coil using the scanner. If the coil data cannot be found then the operator is presented with an error message and the coil cannot be put away in automation. If the coil data is found, the computing facility retrieves the physical size limits of the coil from the database and determines the available storage locations for the coil within the warehouse, if any. The process will revert with either an error message saying that the coil will not fit in the warehouse or will return the number of available positions in the warehouse. If there is room in the warehouse, the operator will use the scanner to select or accept the cradle number. This number is validated against the list of valid cradles and then a message is sent to the automation system to inform it of a coil to put away. The automation system will validate that a coil is present on the specified transfer cradle using the sensors on the transfer cradle. If all is valid then the coil data is retrieved from the database for that barcode.

Until the coil is picked up, the system will continue to monitor the sensors and confirm the presence of a coil. If for any reason the coil is moved the system will generate a fault condition.

As the crane grasps the coil in the cradle, the computing facility compares the width between the legs of the grab when pressed firmly against the coil walls against
in the case of a coil that is specified in the database to be unpackaged, the width of the coil specified in the database; and
in the case of a coil that is specified in the database to be packaged, a calculated width based upon the total of the width of the coil specified in the database and a predetermined amount, specifically, 25 mm, associated with typical packaging thickness.

If the comparison results in a variance greater than 75 mm, a determination is made that the coil has been misidentified, and the automation system ceases operation until such time as the coil has been identified. This variance allows, for example, for coils that have been slightly telescoped in transit.

Automated Coil Picking

When sending coils to the shipping/receiving bay, the process is initiated by via the scanner.

If the coil cannot be found in the storage map then an error message is sent to the operator. Upon successfully locating the coil in the storage map the system sends a message to the computing facility requesting the required coil. The facility locates the coil in the storage map and will reserve a transfer cradle by turning on a flashing red light and then sends a command to the automated crane to retrieve the requested coil and return it to the specified transfer cradle.

If the coil to be retrieved is on a lower level, with a coil above it, the facility determines whether the upper coil is also required. If it is, the facility informs the crane to ship the upper coil first. If it is not, the system determines a new location for the upper coil and informs the overhead crane control system, which relocates the upper coil. When the completion signal is received, the coil at the lower elevation can then be moved as originally requested.

Whereas but a few embodiment are herein described, it will be appreciated that variation is possible.

For example, and without limitation, wherein the illustration shows two layers of coils, it should be understood that the system and method could be used to permit higher stacking. Suitable accommodation would need to be made to the predetermined spacing distance between adjacent coils in each line, to avoid bridging, and as well, the number of open spots in each zone would nominally be increased from two to five.

As well, whereas the exemplary embodiment mentions coil identification being carried out as a function of width, only, similar comparisons could be made of weight, by virtue of weight sensors carried by the grab, and of ID and OD, by virtue of the optical sensors in the grab arms and the distance sensors carried by the hoist.

As well, whereas the space allocation table assumes that the warehouse is large enough to accommodate all coils in inventory and all coils that would normally be inventory, this may not always be the case. In circumstances wherein a warehouse is typically full, and a large allotment of abnormal dimensioned coils arrive, adjustments in spacing would need to be made. Various permutations are of course possible, but one sensible approach would be, in respect of all zones that have "free spots" [i.e. zones that are currently holding fewer coils than the historic, to shrink the zones so that the number of free spots in each zone are reduced proportionally.

Accordingly, the invention should be understood as limited only by the accompanying claims, purposively construed.

The invention claimed is:

1. A facility comprising:
    a berth to accommodate a conveyance, the conveyance being selected from one of a truck, train and boat, wherein the conveyance carries a plurality of coils and each coil carries an identifier;
    a transition zone comprising a plurality of transition areas;
    a first overhead crane extending over the berth and the transition zone, the first overhead crane moves the coils between the conveyance and the transition zone;
    a warehouse;
    a second overhead crane extending over the warehouse and the transition zone, the second overhead crane moves the coils between the transition zone and the warehouse;
    a database configured to receive information about the coils contained in the conveyance, the information containing the dimensions of the coils or information from which the coil dimensions can be calculated; and
    a computing facility configured to, after a coil has been placed into a transition area: receive a coil identifier and cross-reference the coil identifier against the database, wherein, if the coil identifier matches one of the coils in the database, the computing facility instructs the second overhead crane to automatically pickup the coil placed in to the transition area and convey the coil to an appropriate location if the appropriate location is determined to exist in the warehouse for the storage of the coil.

2. The facility according to claim 1, wherein the facility further comprises a bar code scanner, and wherein the computing facility is configured to communicate with the bar code scanner to receive the coil identifier.

3. The facility according to claim 1, wherein each transition area comprises a transfer cradle upon which any of the coils can be placed.

4. The facility according to claim 3, wherein each transfer cradle contains an arrangement to determine if a coil has been placed thereon, and wherein the arrangement relays an indication to the computing facility.

5. The facility according to claim 4, wherein the computing facility is configured to receive the coil identifier for a coil only when the arrangement indicates that the transfer cradle is in receipt of a coil.

6. The facility according to claim 4, wherein the arrangement comprises an optical sensor and an inductive proximity sensor.

7. The facility according to claim 1, wherein the second overhead crane comprises a system for coil identification, wherein the second overhead crane carries out the conveyance of a coil to the appropriate location in the warehouse only if the coil matches the identification of the coil the crane has been instructed to convey.

8. The facility according to claim 7, wherein:
    the database contains, for each coil, details of: a coil width and coil packaging, and wherein the system for coil identification comprises:
    sensors that engage when the legs of a grab are pressed firmly against the coil walls and sensors that determine the distance between the legs; and
    the second overhead crane identifies a coil in its grasp by comparing the width between the legs of the grab when pressed firmly against the coil walls against:
    (i) the width of the coil specified in the database if the coil in its grasp is unpackaged; and (ii) a calculated width based upon the total of the width of the coil specified in the database and a predetermined amount associated with typical packaging thickness if the coil in its grasp is packaged.

9. The facility according to claim 8, wherein the comparing the width between the legs of the grab and the width of the coil allows for a variance of 75 mm for coils that have been slightly telescoped in transit.

10. A facility comprising:
    a berth to accommodate a conveyance, the conveyance being selected from one of a truck, train and boat, wherein the conveyance carries a plurality of coils and each coil carries a coil identifier;
    a transition zone comprising a plurality of transition areas;
    a first overhead crane extending over the berth and the transition zone, the first overhead crane comprising means for moving the coils between the conveyance and the transition zone;
    a warehouse;
    a second overhead crane extending over the warehouse and the transition zone, the second overhead crane comprising means for moving the coils between the transition zone and the warehouse and a system for coil identification;
    a database configured to receive information about the coils contained in the conveyance, the information comprising the dimensions of the coils or information from which the coil dimensions can be calculated; and a computing facility configured to, after a coil has been placed into a transition area: receive a coil identifier of the coil in the transition area and cross-reference the coil identifier against the database, wherein, if the coil identifier matches one of the coils in the database and, the computing facility instructs the second overhead crane to automatically pickup the coil placed in to the transition area and subsequently convey the coil to an appropriate location if the coil matches the identification of the coil the crane has been instructed to convey and if the appropriate location is determined to exist in the warehouse for the storage of the coil.

\* \* \* \* \*